United States Patent [19]

Sato

[11] Patent Number: 5,497,040
[45] Date of Patent: Mar. 5, 1996

[54] OUTER ROTOR TYPE BRUSLESS DC MOTOR

[75] Inventor: Hironobu Sato, Ohta, Japan

[73] Assignee: Sanyo Electric Co., Ltd., Ora, Japan

[21] Appl. No.: 308,405

[22] Filed: Sep. 19, 1994

[30] Foreign Application Priority Data

| Nov. 30, 1993 | [JP] | Japan | 5-300590 |
| Nov. 30, 1993 | [JP] | Japan | 5-300591 |
| Nov. 30, 1993 | [JP] | Japan | 5-300592 |
| Jan. 31, 1994 | [JP] | Japan | 6-009685 |

[51] Int. Cl.$^6$ ................................ H02K 7/00
[52] U.S. Cl. .................... 310/67 R; 310/89; 310/156
[58] Field of Search ................. 310/40, 40 MM, 310/42, 51, 67 R, 89–91, 156, 157, 254, 268

[56] References Cited

U.S. PATENT DOCUMENTS

| 3,614,495 | 10/1971 | Suzuki et al. | 310/268 X |
| 3,676,725 | 7/1972 | Wiser et al. | 310/89 |
| 4,017,964 | 4/1977 | Schulte et al. | 310/42 X |
| 4,829,208 | 5/1989 | Uchino | 310/268 |
| 5,008,573 | 4/1991 | Beppu et al. | 310/67 R |
| 5,144,183 | 9/1992 | Farrenkopf | 310/268 |
| 5,252,873 | 10/1993 | Hamamoto et al. | 310/90 |

Primary Examiner—Mark O. Budd
Attorney, Agent, or Firm—Armstrong, Westerman, Hattori, McLeland & Naughton

[57] ABSTRACT

An outer rotor type brushless DC motor has: a first housing member formed of a sheet metal by press-working and having a first central bearing receiver also formed by press-working in the form of generally hollow cylinder; a second housing member formed from a sheet metal by press-working and having a second central bearing receiver also pressed in the form of generally hollow cylinder; a hollow cylindrical stator support formed of a sheet metal by press-working and having one end mounted on the first bearing receiver of the first housing member and another end for receiving the stator on the outer surface of the stator support; a magnets support press-worked from a electrical steel sheet metal for supporting magnets around the stator and inside the second housing member; a first bearing mounted in the first bearing receiver; a second bearing mounted in the second bearing receiver coaxially with the first bearing; and a freely rotatable shaft mounted on the first and second bearings, for firmly supporting thereon the stator support. The motor may be assembled in simple steps without any molding to suppress vibrations and noises. The motor has a suitable design for mass production.

14 Claims, 16 Drawing Sheets

OUTER ROTOR TYPE BRUSLESS DC MOTOR

FIELD OF THE INVENTION

The invention relates to outer rotor type brushless DC motor for use with household electric appliances.

BACKGROUND OF THE INVENTION

Present household electric appliances mostly utilize electric motors. Take For example a light-weight duty air-conditioning system, which utilizes motors for an indoor side heat exchanger as well as an out -door side heat exchanger. These motors generally have output powers in the range of few Watts to tens of Watts, and most of them are brushless DC motors for their high power efficiency.

An example of such DC motor is an outer rotor type DC motor, as disclosed in Japanese Utility Publications 63-16297, which comprises a stator made up of a multiplicity of coils wound on respective teeth and a rotor having magnets surrounding the stator. Another type of such DC motor is an inner rotor type DC motor, which has a rotor installed inside a stator, as disclosed in Japanese Utility Publication 63-34449.

In order to manufacture compact air-conditioners, it is very important to provide them with fan motors small in size, wherein the size of a motor is given by the following formula: $T = 2 \times L \times D$, where T is the output torque of the motor; L is the total thickness of the multiple teeth; and D is the inner diameter of an air gap between the rotor and the stator of the motor.

Consequently, in order to obtain high-output power under a given output torque requirement, the inner air gap D should be as large as possible. Thus, outer rotor type motors generally having larger air gads D than inner rotor type motors, are superior to the latter type. This in turn implies that for a give output an outer rotor type motor may have less thickens than corresponding inner type motor. A further advantage of outer rotor type motors is that in winding coils it is much easier to work with outer rotors than with inner type rotors, requiring much fewer assembling processes.

A typical outer rotor type brushless motors has a stator molded in a thermally cured resin to reduce vibrations and noises that can arise from lose contacts of elements involved, as discussed in Japanese Patent Early Publication 4-236155.

However, such outer rotor type brushless DC motors are usually difficult to dismantle once it is molded in resin and thermally cured. Thus, defective motors such as those having manufacturing flaws or deteriorated by aging have been disposed in ground, without removing their stators. This can cause, however, serious environmental hazards. Moreover, their manufacture requires a large number of molding installations to meet large and/or spontaneous demand for such motors, since molding takes time.

SUMMARY OF THE INVENTION

The invention is directed to overcome the problems as mentioned above by providing a compact outer rotor type brushless DC motor which may be manufactured in mass production without need of embedding its stator in molded resin to prevent vibrations and noises.

In one aspect of the invention, an outer rotor type brushless DC motor according to the invention has coils each wound on respective teeth of a stator, and a rotor having magnets arranged to surround the stator, the DC motor comprising: a first housing member formed of a sheet metal by press-working and having a first central bearing receiver also formed by press-working in the form of generally bottomed hollow cylinder; a second housing member formed from a sheet metal by press-working and having a second central bearing receiver also pressed in the form of generally bottomed hollow cylinder which is coaxial with the first bearing receiver, the second housing member mating and securely connected with the first housing member at their rims to form a space inside thereof; a hollow cylindrical stator support formed of a sheet metal by press-working and having one end mounted on the first bearing receiver of the first housing member and another end for receiving the stator on the outer surface of the stator support; a magnets support press-worked from a paramagnetic sheet metal for supporting magnets around the stator and inside the second housing member, the magnets support securely mounted on the shaft; a first bearing mounted in the first bearing receiver; a second bearing mounted in the second bearing receiver coaxially with the first bearing; and a freely rotatable shaft mounted on the first and second bearings, for firmly supporting thereon the stator support.

A motor having this structure may be easily manufactured without molding processes in a mass production line, and yet suffers little vibrations and noises.

In the outer rotor type DC motor as mentioned above, the sheet metal is preferably a steel sheet; and the bearing receivers are each formed by a double-press-working; and the stator support is a hollow cylinder adapted to be securely mounted on the outer surface of the bearing receiver of the first housing member.

With this arrangement, both housing member may have flat ends and minimized height, resulting in a very compact outer rotor type brushless DC motor having a thin configuration.

The stator support preferably has a diametrically larger section and a smaller section, forming a step portion between them, the step portion allowing for positioning the stator at a predetermined axial position as the stator is fitted on the stator support.

The step portion facilitates the stator to be positioned at a definite optimum position, thereby preventing it from offset from the position thereafter.

The magnets support preferably has an annular yoke having an inner wall for securely supporting the magnets; a shaft mount in the form of hollow cylinder to be mounted on the shaft; and a radial wall extending from the annular yoke to the shaft mount.

The magnets support having this arrangement may hold the magnets under centrifugal force acting on them, and preventing them from being scattered away if fractured. It should be noted that the magnets support may be efficiently fitted within a minimized housing of the motor.

The magnets support is preferably made of a thin plate of electrical steel sheet, such that the yoke has a predetermined thickness by folding the plate at least twice to provide the yoke with a predetermined total thickness.

Such magnets support may have a thin overall configuration, yet yoke is unlikely to suffer magnetic saturation.

Instead of inwardly projecting bearing receivers, the first and the second housing member may alternatively have outwardly projecting bearing receivers formed by press-working, while the hollow stator support cylinder has a form of flange portion which is fitted within a positioning recess formed outside the bearing receiver of the first housing member.

This type of outwardly projecting bearing receivers may be utilized to mount the motor on an appliance.

The magnets support mentioned above may be mounted on the shaft via a vibration prevention rubber.

This will help suppress unnecessary vibrations and noises due to loose connections of the magnets support, for example.

In this case, the vibration prevention rubber may be forced between an outer metal sleeve fixedly mounted on the inside of the shaft-bearing portion and an inner metal sleeve into which the shaft is securely fitted.

This arrangement allows easy mounting of the vibration prevention rubber in position between the shaft and the magnets support.

In the example of an outer rotor type brushless DC motor described above, the bearings of the first and the second housing members may be wicks made of sintered metal which has soaked oil (oilless or oil-free bearings).

Such bearings will further prolong the life of the high quality motor.

In another aspect of the invention, an outer rotor type brushless DC motor of the invention includes coils each wound on respective spokes of a stator, and a rotor having magnets arranged to surround the stator. The DC motor comprises: a first housing member formed of a sheet metal by press-working and having a central, cylindrical projection formed by press-working; a hollow cylindrical stator support formed of a sheet metal by press-working and having one end closed to form a first bearing receiver and adapted to receiving the stator on the outer surface of the stator support; a second housing member formed of a sheet metal by press-working and having a second central, inwardly projecting cylindrical bearing receiver formed by press-working such that the second cylindrical bearing receiver is coaxial with the first bearing receiver, the second housing member mating and securely connected with the first housing member at their rims to form a space inside thereof; a first bearing mounted in the first bearing receiver; a second bearing mounted in the second bearing receiver coaxially with the first bearing; a magnets support formed of a electrical steel sheet plate by press-working for supporting the magnets around the stator and inside the second housing member; a freely rotatable shaft mounted on the first and second bearings for securely supporting the stator mounted on the shaft.

The motor of this type requires no molding to suppress vibrations and noises, so that it may have a compact design and is suitable for mass production. It should be appreciated that the stator support cylinder may be mounted very easily and firmly, preventing any notable vibrations and noises.

In this example, the cylindrical stator support preferably has a diametrically smaller section which is fitted inside the cylindrical projection of the first housing member, and a diametrically smaller section for receiving on the outer surface thereof the stator, and a step across the diametrically larger and smaller sections serving as a stop for positioning the cylindrical stator support in position on the projecting cylinder.

This design allows the stator support cylinder, and thus the stator as well, to be positioned accurately and firmly in position with respect to the projecting cylinder of the first housing member.

In a further aspect of the invention, an outer rotor type brushless DC motor, including coils each wound on respective spokes of a stator, and a rotor having magnets arranged to surround the stator, comprises: a first housing member formed of a sheet metal by press-working and having a central cylindrical projection formed by press-working, and a first outwardly projecting bearing receiver formed inside and coaxial with the central cylinder by press-working; a second housing member formed of a sheet metal by press-working and having a second outwardly projecting bearing receiver coaxial with the first bearing receiver by press-working, the second housing member mating and securely connected with the first housing member at their rims to form a space inside thereof; a first bearing mounted in the first bearing receiver; a second bearing mounted in the second bearing receiver coaxially with the first bearing; a freely rotatable shaft mounted on the first and second bearings; a hollow cylindrical stator support formed from a sheet metal by press-working and having one end mounted on the bearing receiver of the first housing member and another end for receiving the stator on the outer surface of the stator support; a magnets support press-worked from a electrical steel sheet plate for supporting magnets around the stator and inside the second housing member, the magnets support securely mounted on the shaft.

The brushless DC motor of this type also requires no molding of resin over the stator to suppress vibrations and noises, so that it may have a compact design and may be assembled in a simple manner, which is suitable for mass production. It would be apparent that, although both bearing receivers project outwardly, the stator support cylinder may be mounted easily and firmly on the projecting cylinder of the first housing member.

The projecting cylinder of the first housing member preferably have a larger inner diameter than that of the first bearing receiver. This facilitates mounting of the first bearing into the bearing receiver.

DETAILED DESCRIPTION OF THE PREFERRED EMBODIMENT

Figure 1:
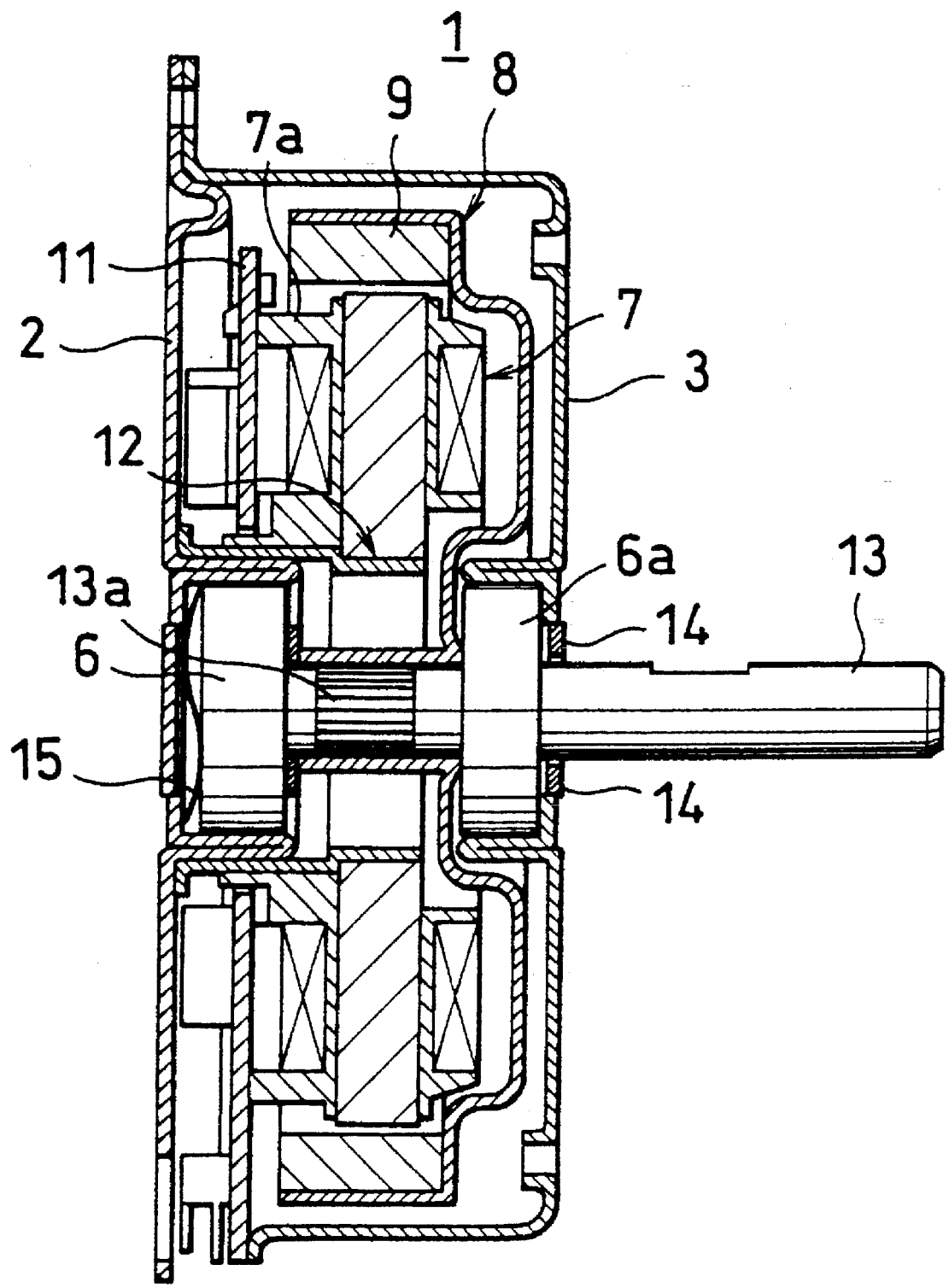
FIG. 1 is a Side cross section of a first outer rotor type brushless DC motor according to the invention.
Figure 2:
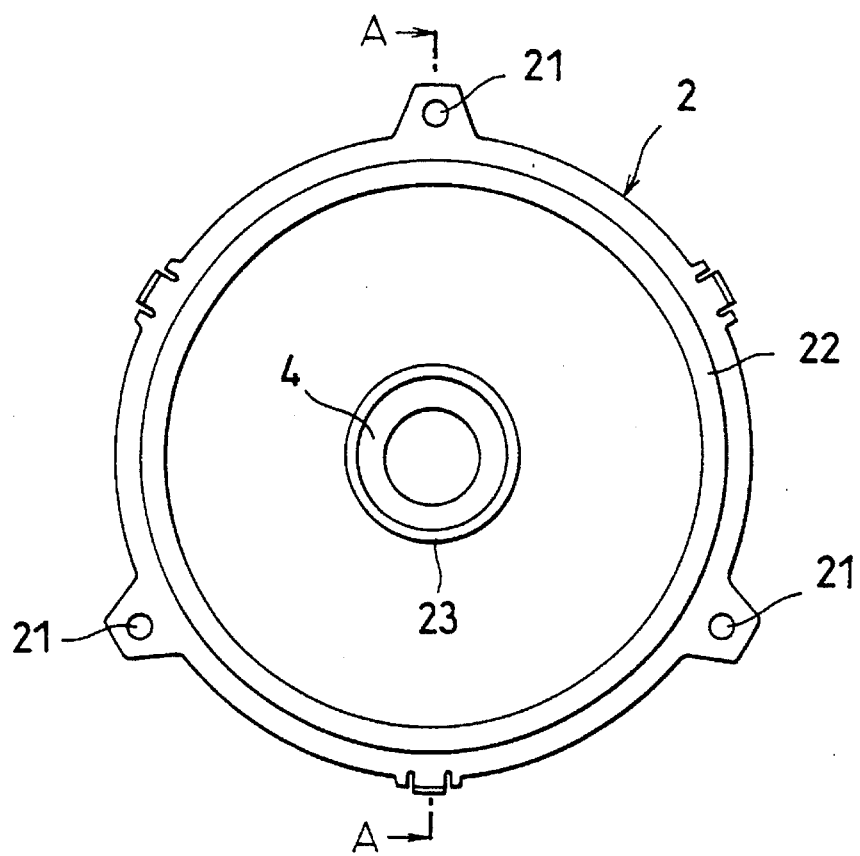
FIG. 2 is a plain view of the motor shown in FIG. 1.
Figure 3:
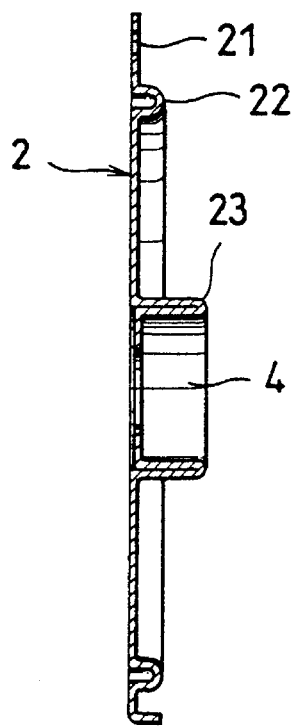
FIG. 3 is a cross section of the first housing member taken along line A—A of FIG. 1.

Referring now to FIGS. 1 through 3, there is shown in cross section a first example of outer rotor type brushless DC motor according to the invention. The motor has a housing member or a body 1 which includes a first and a second housing members 2 and 3, respectively.

The first housing member 2 has a generally circular shape and has a central cylinder which forms inside thereof bearing receiver 4 in the form of a recess for securely receiving a bearing as will be described later and as best shown in FIGS. 2 and 3. The cylinder is formed integral with the first housing member 2 by first press-working a steel sheet such as steel plate, to form a cylindrical projection in the first housing member 2 and then press-working again to form the recess 4.

Figure 4:
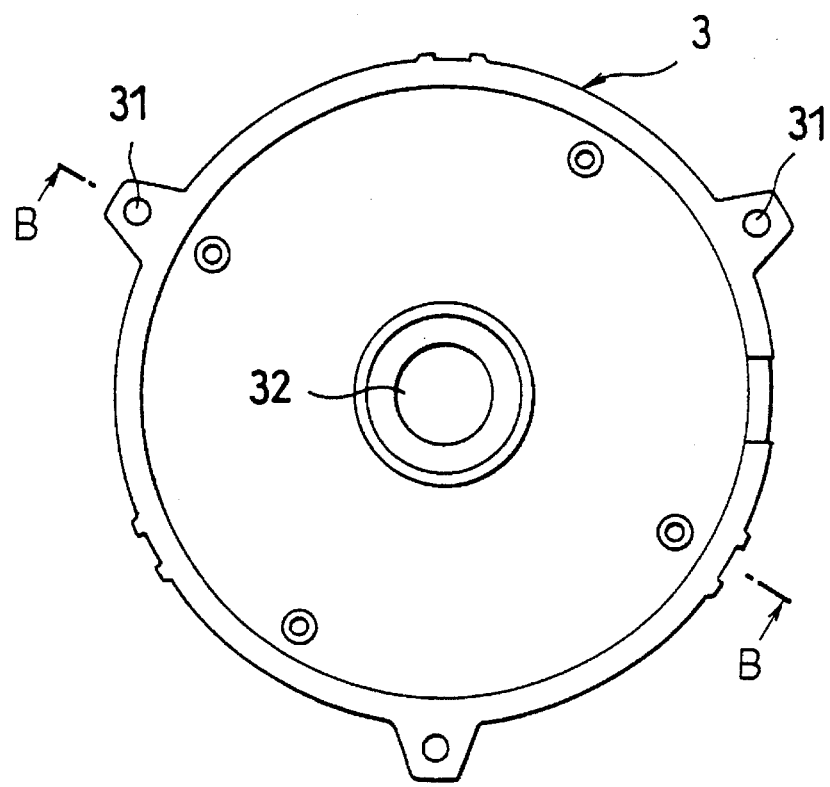
FIG. 4 a plain view of the second housing member of the motor shown in FIG. 1.
Figure 5:
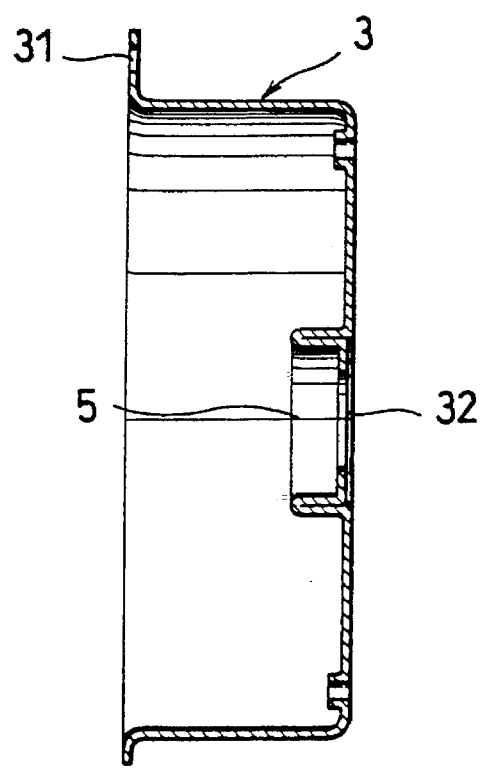
FIG. 5 is a cross section of the second housing member taken along line B—B of FIG. 1.

The second housing member 3 is formed of a steel sheet by press-working into the form of bottomed cylinder. As shown in FIG. 5 illustrating the cross section of the second housing member taken along line B—B of FIG. 4, the second housing member 3 also has a second central bearing receiver 5 inside a central cylindrical protrusion which projects inwardly from the bottom. The bearing receiver receives a second bearing therein. This bearing receiver is also formed to be integral with the steel sheet bottom by press-working. The first housing member 2 and the second housing member 3 are coupled at their generally circular rims, forming an inner space for accommodating major portions of the motor.

The recesses or bearing receivers 4 and 5, respectively, receive securely hold a first and a second bearings 6 and 6a, respectively, when the bearings are forced thereinto.

As shown in detail in FIGS. 2 and 3, the first housing member 2 has a screw hole 21 and a rib 22 for fastening the second housing member 3 mounting on the first housing member 2. The second housing member 3 also has a hole 31 for receiving a screw and a hole 32 for passing therethrough a shaft, as shown in FIGS. 4 and 5.

Figure 6:
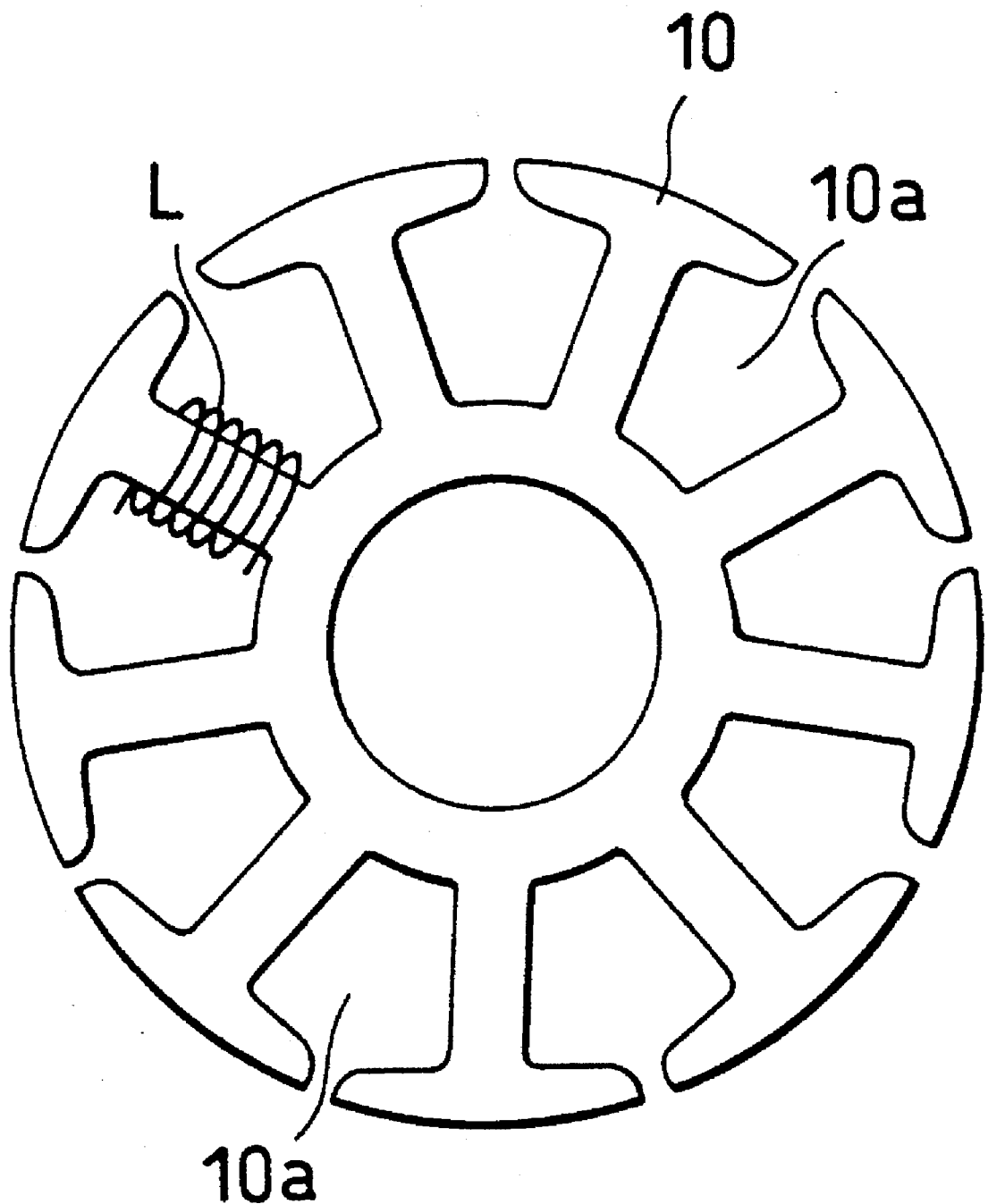
FIG. 6 is a plain view of a stator core of the motor shown in FIG. 1.

A stator 7 has a stator core 10, which is a stack of electrical steel sheets punched in the form of wheel having a multiplicity of teeth and peripheral ears as shown in FIG. 6. The stator core 10 is coated with an insulating material. Wound on each of the bundled teeth is a coil L. A rotor 8 (FIG. 1) has a magnets support which bears magnets 9.

It would be appreciated that an outer rotor type motor having a stator as depicted in FIG. 5 is easier to manufacture than inner rotor type motor, since outward openings 10a between ears may provide better access to the teeth in winding the coils L on the teeth, while in the inner rotor type motor openings are formed inwardly and providing Door access to the teeth. The stacked stator core is skewed so that cogging torque is minimized to prevent vibrations and noises during operation of the motor.

Taps of the coils L of the stator 7 are properly connected to motor terminals of an electronic circuit board 11 (not shown) mounted on an insulated section 7a of the stator 7 (FIG. 1).

Figure 7:
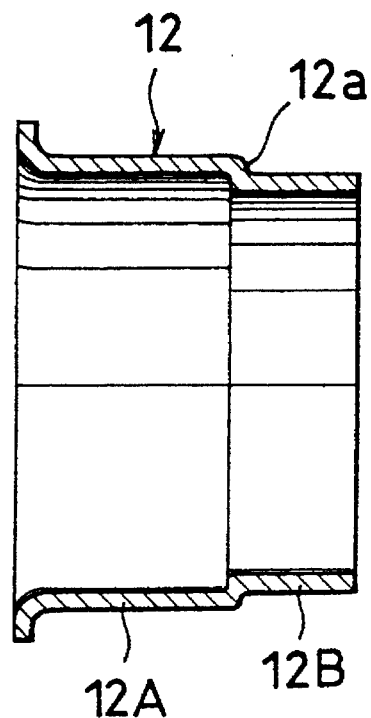
FIG. 7 is a side cross section of a stator support cylinder of the motor shown in FIG. 1.
Figure 8:
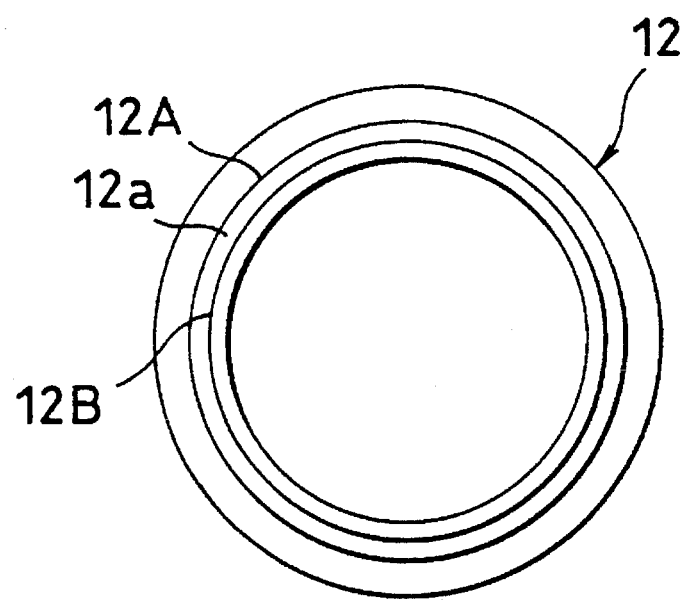
FIG. 8 is a plain view of the stator support cylinder shown in FIG. 7.

The stator 7 is mounted on the outer surface of a stator support cylinder 12 by forcing the stator 12A of the stator support cylinder 12. The opposite end 12A of the stator support cylinder is in turn securely mounted on the outer surface of the cylindrical inward projection 23 (FIG. 2) by forcing the stator support cylinder 12 on the projection 23. As shown in FIG. 7 and FIG. 8, it should be noted that the stator support cylinder 12 has a step 12a near the end 12B for positioning the stator 7. The step 12a may be formed during the press-working of the stator support cylinder 12.

With this step 12a, the stator 7 may be accurately positioned as it is forced on the stator support cylinder 12 and securely held in position thereafter, preventing vibrations and noises that can otherwise arise during the operation of the motor. This step also permits of securing a space between the stator 7 and the housings in accordance with Japanese Electric Appliance Regulations.

The diametrically larger section of the stator support cylinder 12 has an inner diameter larger than the outer diameter of the first bearing 6, so that the first bearing 6 may be easily introduce into the first bearing receiver after the stator support cylinder 12 is fitted on the cylindrical projection 23 of the first housing member 2. It would be appreciated that the recess 4 has a good roundness suitable for receiving the first bearing 6 without causing scars on the bearing 6, since the recess is formed by press-working in forming the cylindrical projection 23 of the first housing member 2, so that the wall has sufficient rigidity to stand the pressure applied by the stator support cylinder 12 mounted on the outer surface of the cylindrical projection.

Figure 9:
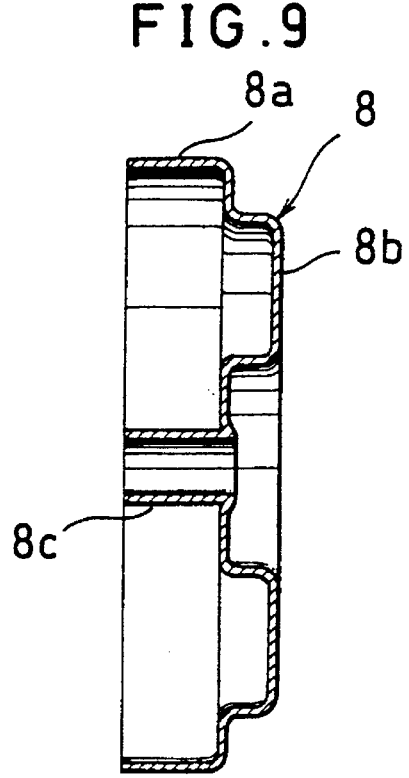
FIG. 9 is a side cross section of a magnets support constituting the rotor of the motor shown in FIG. 1.
Figure 10:
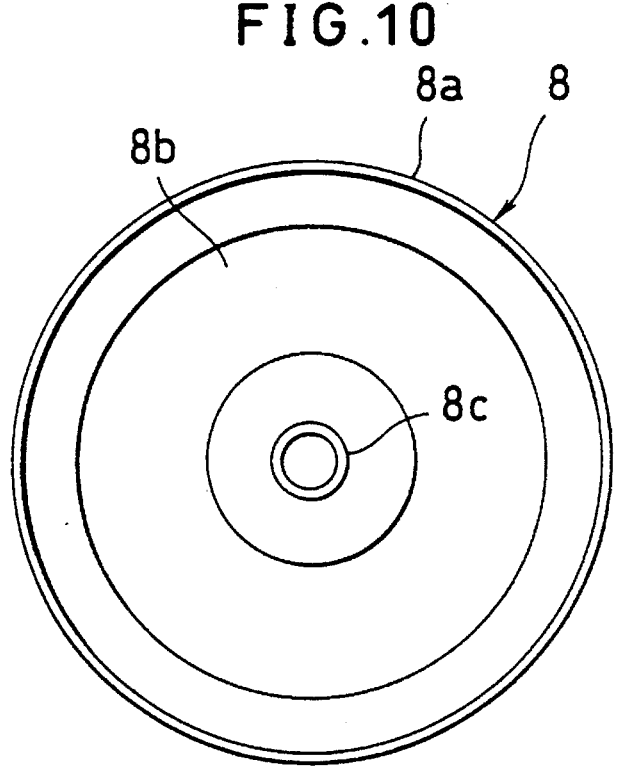
FIG. 10 is a plain view of the magnets support of the stator of the motor of FIG. 1.

The rotor magnets support 8 is made of a steel plate, having a configuration to fit in a predetermined space defined by the first housing member 2 and the second housing member 3 coupled with the first housing member 2. As shown in FIG. 9 and FIG. 10, the rotor 8 may be stamped from a paramagnetic sheet plate to have an outer annular yoke 8a for holding magnets 9 on the inner wall of the yoke 8a, a radial yoke plate or side wall 8b (describe in more detail in connection with a shaft 13), and a cylindrical shaft mount 8c that may fit on a shaft between the first and the second bearings 6 and 6a (FIG. 1).

By mounting the magnets 9 on the inner wall of the yoke 8a, the magnets are protected from being cracked by centrifugal forces acting on them during operation and, should the magnets be cracked, they are prevented from dispersing in the housing, since the yoke 8a may hold the magnets 9 against the centrifuge during the operation.

It would be appreciated that by forming the rotor 8 so as to fit in the second housing member 3 the radial dimension of the body 1 may be minimized, and that by forming the shaft mount 8c to fit between the two bearings 6 and 6a, the height of the body 1 may be minimized.

The shaft 13 is supported at its opposite ends by the two bearings 6 and 6a, so that it is freely rotatable with respect to the body 1. Firmly mounted on the shaft is the shaft mount 8c of the yoke 8a. The portion of the shaft 13 bearing shaft mount 8c is knurled so that the shaft has a better grip of the shaft mount 8c and prevents it from being offset from its position. FIG. 1 also shows a bearing stop 14 for preventing the bearing 6 from popping out of the recess 4 and a bias spring 15 for forcing the bearing 6 toward the bearing stop 14.

The outer rotor type brushless DC motor is assembled as follows.

In assembling the body 1, the stator 7 is first forced on the stator support cylinder 12 until the stator 7 abuts on the step 12a of the cylinder 12. The cylinder 12 is then securely mounted in position on the outer surface of the cylindrical projection of the first housing member 2.

The bias spring 15 is then placed in the recess 4 of the first housing member 2, after which the bearing 6 is introduced in the recess 4 through the stator support cylinder 12. Next, one end of the shaft 13 which has the shaft mount 8c to form an integral component is inserted in the bearing 6.

Next, the bearing 6a is mounted on the opposite end of the shaft 13 and shifted on the shaft until it reaches a predetermined position on the shaft. These bearings allow the shaft to rotate freely with respect to the two bearings 6 and 6a. Finally, the second housing member 3 is mounted on the first housing member 2, so that the bearing 6a is firmly fitted in the bearing receiver 5 of the second housing member 3. The two housing members 2 and 3 are then fastened by means of screws, forming the body 1.

It should be noted that the body 1 thus assembled has small dimensions due to the fact that: firstly, the first and the second housing members 2 and 3 are fabricated from steel sheets by press-working; secondly, the body 1 has a minimum height because of the rotor 8 which is adapted to fit within the second housing member 3; thirdly, the stator 7 may be firmly fixed in position in the motor without molding process by fitting the stator 7 on the stator support cylinder 12 which is in turn firmly fixed on the cylindrical projection of the first housing member 2.

Figure 11:
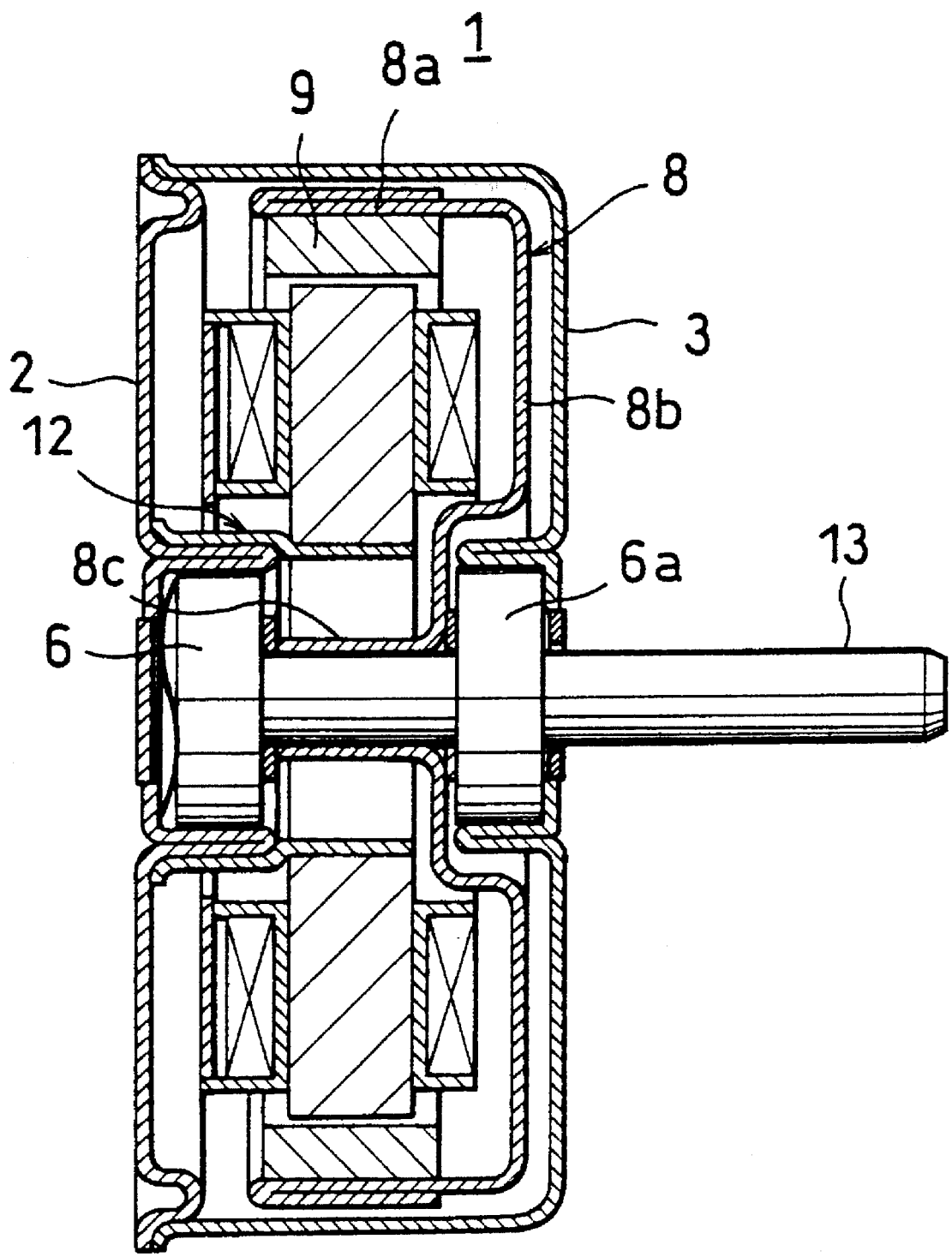
FIG. 11 is a side cross section of a second outer rotor type brushless DC motor according to the invention, showing that an annular yoke portion of the magnets support is doubly folded to prevent magnetic saturation.

The yoke 8a must have a sufficient thickness to prevent magnetic saturation in the yoke. For this reason the whole rotor 8 could be formed of a thick metal plane. However, if the rotor 8 were so formed, its overall thickness would be too great. The rotor 8 of the invention is formed of a thin electrical steel sheet such that the yoke 8a has a sufficient thickness. This may be achieved by folding that portion of the steel sheet at least twice by press-working, thereby forming the yoke 8a having a prescribed thickness, as shown in FIG. 11.

By forming the yoke 8a from a thin steel sheet in his manner, not only the manufacturing cost but also the weight and the size of the yoke, and hence of the body 1, are reduced. It should be noted that a space is provided between the permanent magnets 9 and the side wall 8b of the yoke 8, as shown in the FIG. 11, so that magnetic fluxes leaking from the magnetic loops established between adjacent poles of the magnets 9 are minimized.

In the example described hereinabove the first bearing is depicted to be firmly received in the recess 4 formed in the first housing member. However, the first bearing may be alternatively fitted in the stator support cylinder 12 by providing the stator support cylinder with a bottom to receive the first bearing, as discussed in a third example described below.

Figure 12:
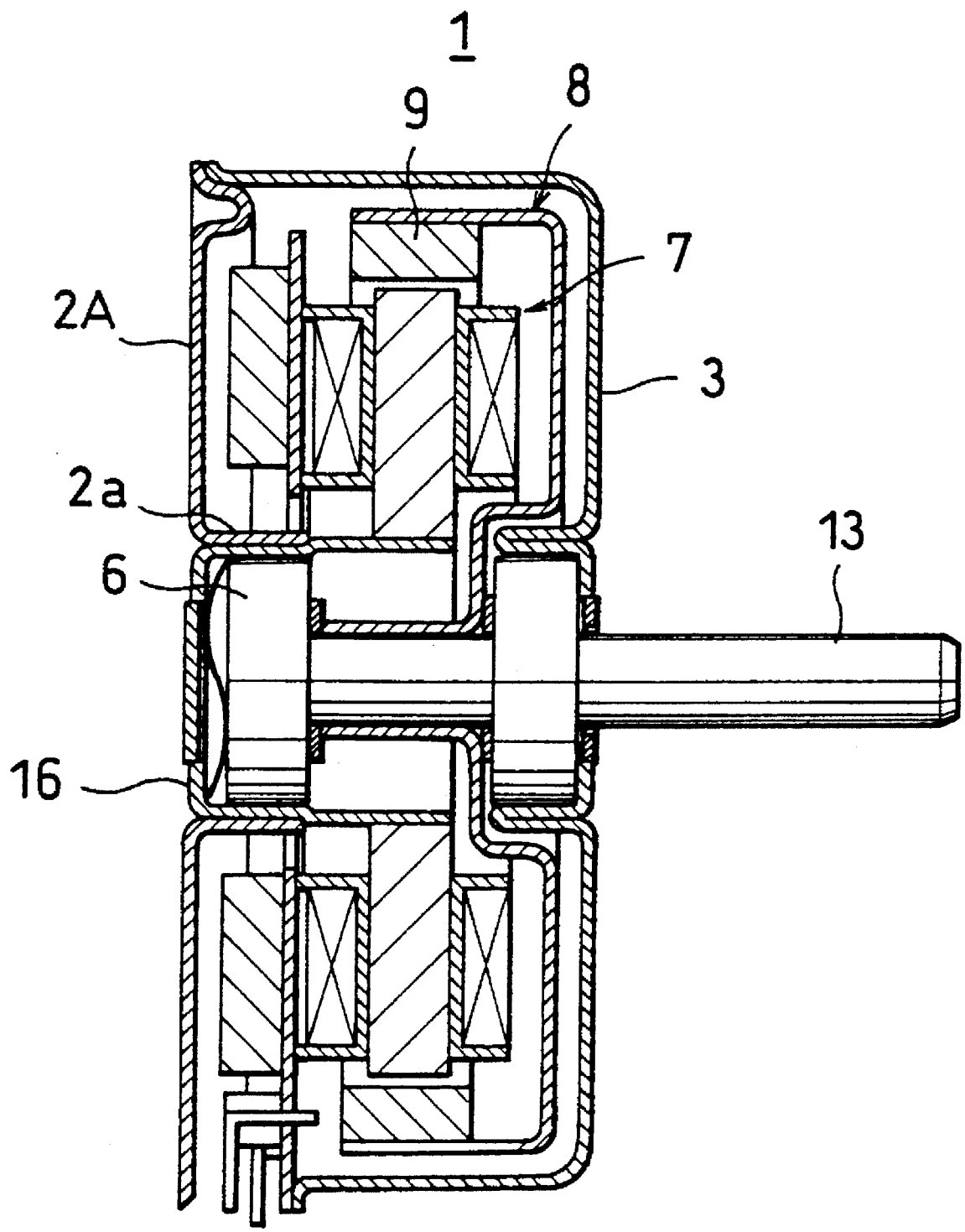
FIG. 12 is a side cross section of a third outer rotor type brushless DC motor according to the invention, showing that the cylindrical stator support has a bottom for firmly receiving a first bearing, and that the stator is securely mounted on the outer surface of the cylindrical stator support.

In FIG. 12, like reference numbers designate like or corresponding elements as in FIG. 1. A first housing member 2A, formed from a steel sheet by press-working, has an inwardly extending cylindrical projection 2a formed coaxially about the center of the first housing member 2. Securely fitted in the cylindrical projection 2a is a stator support cylinder 16 which is also formed by press-working a steel sheet into a bottomed cylinder. Securely mounted on the outer surface, and opposite end of the bottom, of the stator support cylinder 16 is a stator 7.

By fitting the bottom of the stator support cylinder 15 in the cylindrical projection 2a, the stator support cylinder 16 and the first housing member 2A becomes firmly united. Since the stator 7 is secured on the stator support cylinder 16, it is not necessary to embed the stator 7 in a molded resin for the purpose of preventing vibrations and noises of the stator 7.

The stator support cylinder 16 of this example has a bottom section which is diametrically smaller than its upper section where the stator 7 is fitted, thereby forming a step between the two sections. This larger section permits the first bearing 6 to be introduced easily into bottom of the stator support cylinder 16. The step serves as a stop for accurately positioning the stator 7 on a predetermined height with respect-to the tip of the cylindrical projection 2a. Thus, the stator 7 may be positioned at a predetermined height from the bottom.

Figure 13:
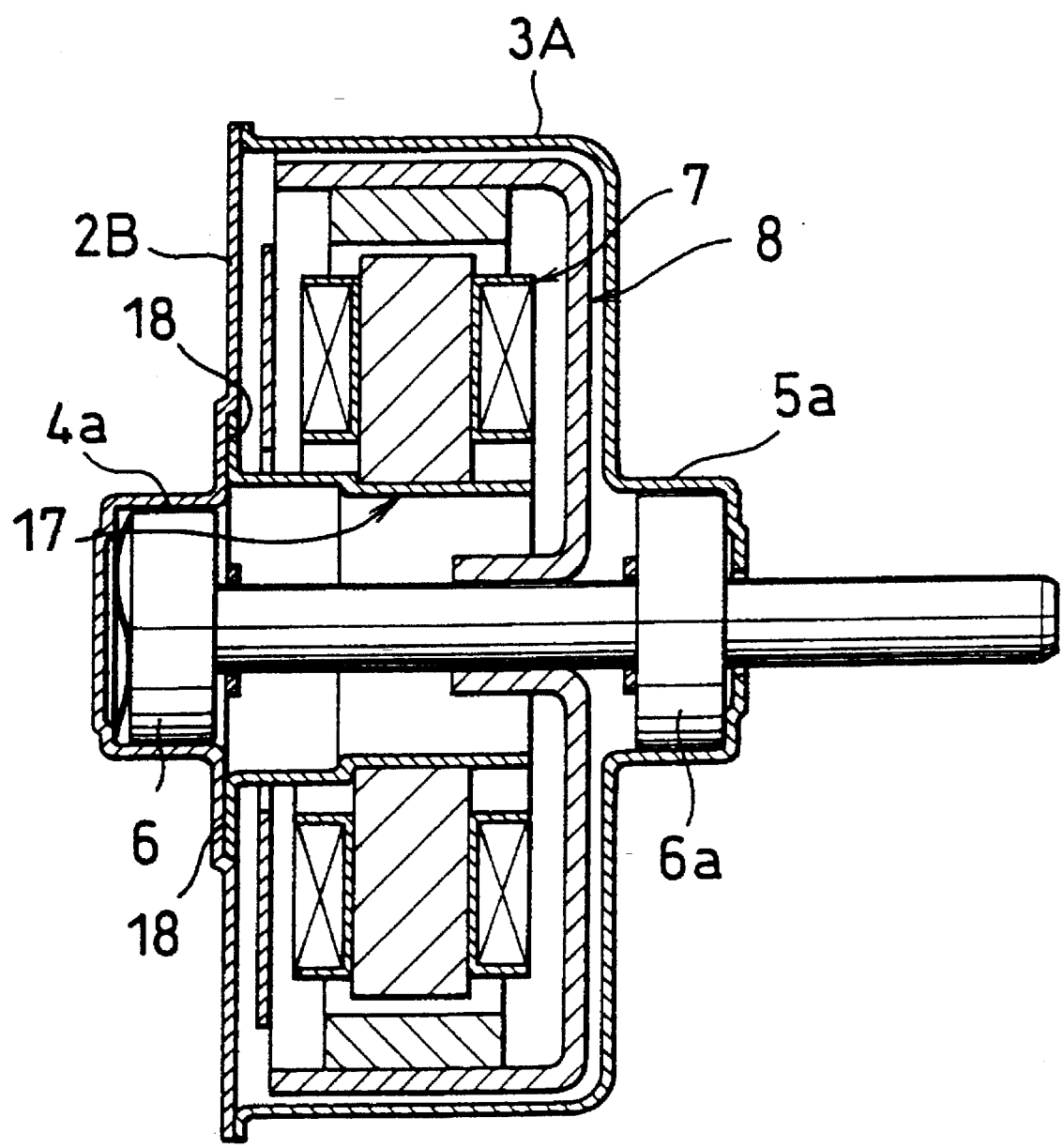
FIG. 13 is a side cross section of a fourth outer rotor type brushless DC motor according to the invention, in which opposite bearing receivers project outwardly for ease of mounting the motor on an appliances.

In the example above, the first and the second housing members 2 and 3, respectively, are described to constitute flat surfaces of the body 1 of the motor. However, such flat surfaces are not necessarily convenient in mounting the motor on an appliance. Thus, portions of the first and the second housing members accommodating the bearings may be formed to project outwardly from the rest portions of the generally flat surfaces of the body, as seen in a fourth example described below and shown in FIG. 13. In FIG. 13, like reference numbers designate like or corresponding elements as in FIG. 1.

As shown in FIG. 13, a first housing member 2B, formed from a steel sheet by press-working, has a cylindrical bearing receiver 4a projecting outwardly from the center of the first housing member 2B. A second housing member 3A, also formed from a steel sheet by press-working, has a cylindrical bearing receiver 5a projecting outwardly from the center of the housing member 3A. The second housing member 3A is coupled with the first housing member 2B, forming a housing. A stator support cylinder 17 has a form of flange section, which is securely fixed on the inside of the bearing receiver 4a by welding, for example. The stator support cylinder 17 also has a section formed to bear a stator 7 which is tightly fitted on the outer surface of that section.

The first housing member 2B is provided with a recess 18 for receiving the stator support cylinder 17 so that the stator cylinder may be positioned in the recess accurately.

Such outwardly projecting bearing receivers 4a and 5a may not only accommodate bearings 6 and 6a but also provide convenience in mounting the motor on an appliance. It should be appreciated that molding of a resin to fix the stator 7 in the first housing member 2B is not needed if the stator support cylinder 17 is secured on the first housing member 2B by welding, for example.

Figure 14:
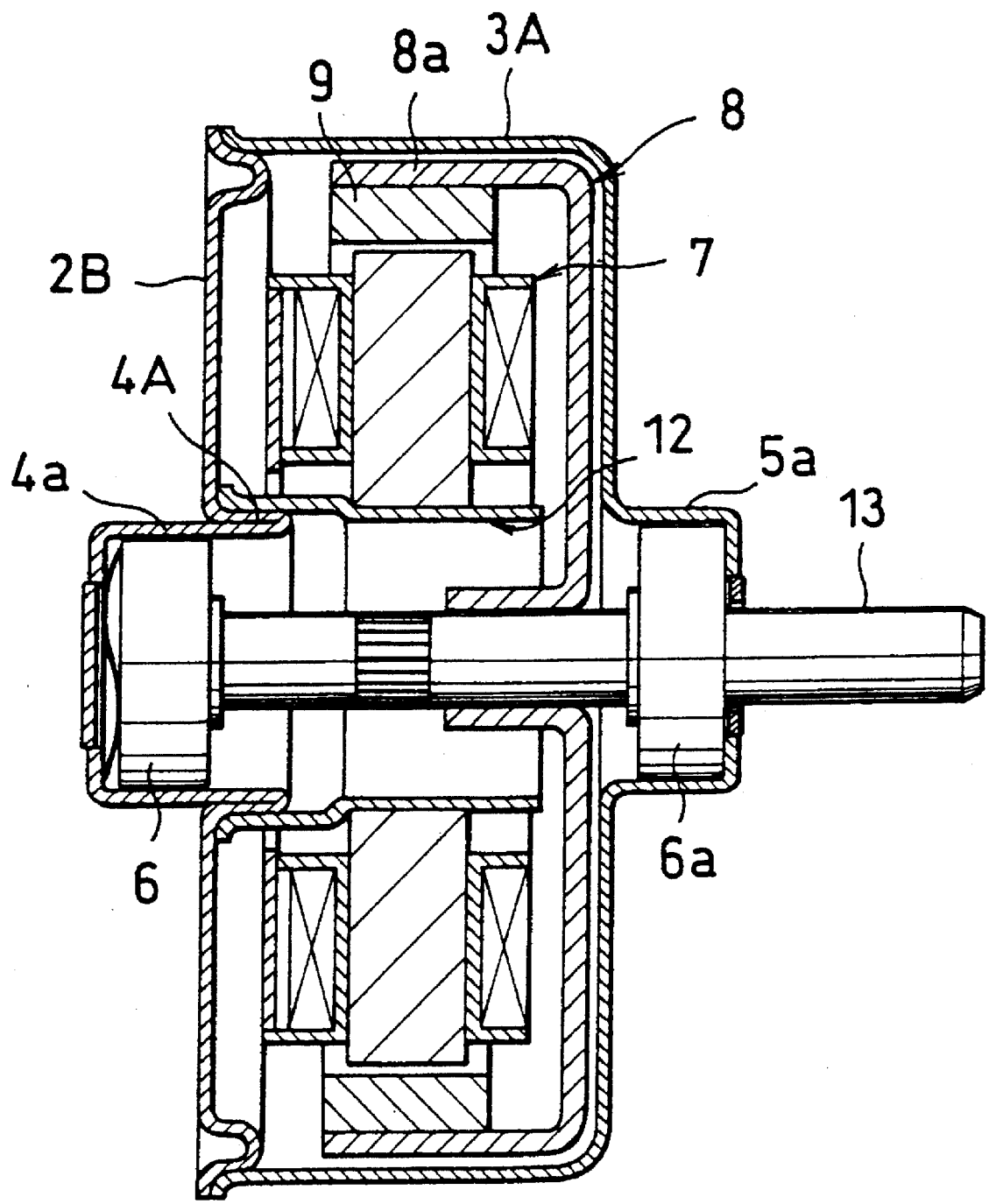
FIG. 14 is a side cross section of a fifth outer rotor type brushless DC motor according to the invention, showing an improved stator support for the motor shown in FIG. 13, for ease of mounting the stator support.

FIG. 14 shows an alternative arrangement for the fourth example, in view of the fact that welding of the stator support cylinder 17 often fails to provide sufficient strength of the cylinder 17 in the course of in usage. In this Figure, like reference numbers designate like or corresponding elements as in FIG. 13. A first housing member 2B shown in FIG. 14 has a central, inwardly projecting cylindrical support 4A which is fabricated from a steel sheet by a first press-working. Following the cylindrical support 4A, an externally protruding first bearing receiver having a first recess 4a is formed by a second press-working to allow for reception of a first bearing 6 therein.

A second housing member 3A is also fabricated from a steel sheet into a generally cylindrical configuration. The second housing member 3A also has a central projecting bearing receiver 5 for receiving inside thereof a second bearing 6a to face the first bearing 6 placed in the first recess 4a of the first housing member 2B.

In order to suppress magnetic saturation, an annular yoke 8a formed a part of a magnets support or rotor 8 must have a sufficient thickness. Thus, the thickness of the steel plate for the yoke 8a and hence rotor 8 is so chosen as to satisfy this requirement. Other features of the fifth example are similar to those of the fourth example discussed above.

This exemplary motor is also simple in structure, and hence easy to manufacture and assemble. Further, since the motor does not require molding foe the stator, it may have a compact design. Projections of the bearing receivers 4a and 5a may be convenient in mounting the body 1 of the motor on an appliance. Any vibrations and noises of the motor may be absorbed by resilient rubber members interposed between the receivers 4a and 5a and the appliance.

It would be appreciated in this fifth example that the stator support cylinder 12 may be mounted much easily and firmly on the first housing member 2B member than in the fourth example, since the cylindrical support 4A for receiving the stator support 12 is formed integrally with the bearing receiver 4a for receiving the bearing 6 from a steel sheet by press-working.

Figure 15:
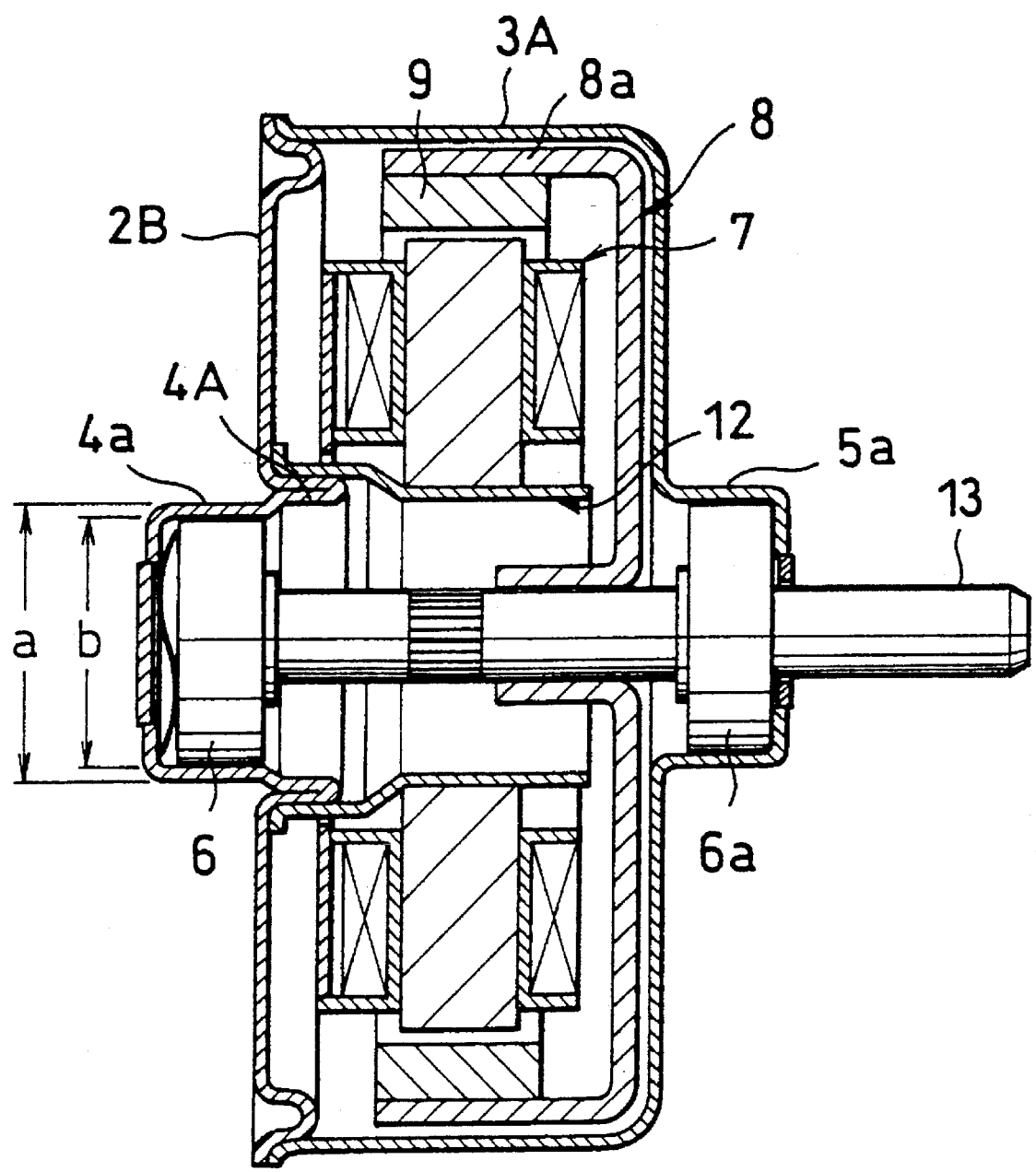
FIG. 15 is a side cross section of a sixth outer rotor type brushless DC motor according to the invention, showing an improved first bearing receiver for ease of mounting bearings therein.

FIG. 15 shows a sixth motor according to the invention, which is designed particularly to allow a first bearing to be mounted easily in the first housing member. In this figure, like reference numbers designate like or corresponding elements as in FIG. 14.

In this example, the inner diameter "a" of a cylindrical support 4A is slightly greater than the inner diameter "b" of the bearing receiver 4a of the first housing member 2B.

Consequently, a first bearing 6 may path through the cylindrical support 4A easily as it is fitted in the bearing receiver 4a. This will prevent deformation of the cylindrical support 4A caused by forcing the bearing through the cylindrical support 4A if the diameter "a" were the same as "b".

It would be understood that both of the bearing receivers and the stator support cylinder 12 are not limited to those integrally press-worked from a steel sheet. They may be fabricated independently of the first housing member and later integrated with the first housing member by welding, for example, as shown in a seventh example illustrated in FIG. 16.

Figure 16:
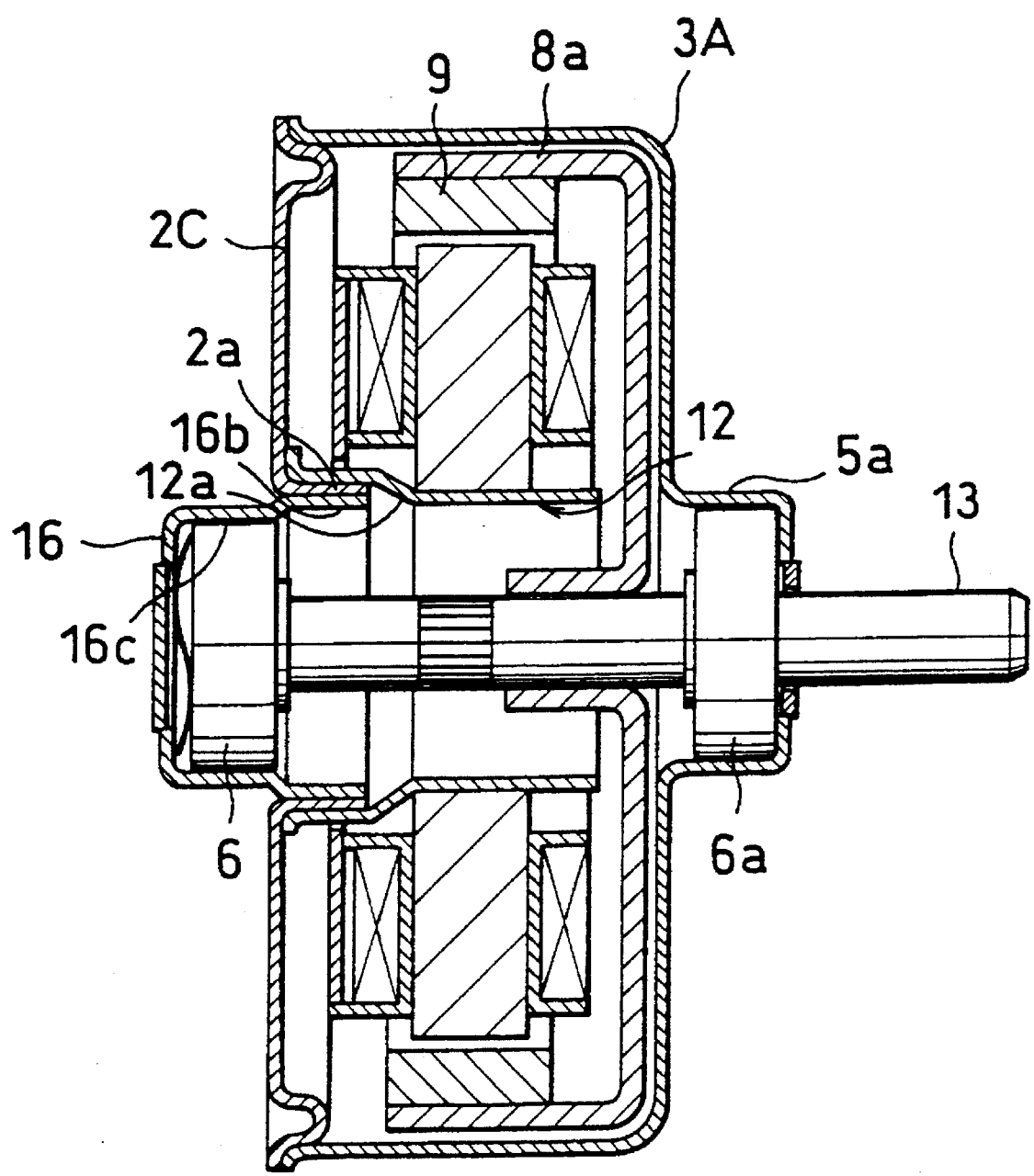
FIG. 16 is a side cross section of a seventh outer rotor type brushless DC motor according to the invention, having a bearing receiver which is fabricated independently of the first housing member.

As shown in FIG. 16, a first housing member 2c has a central cylindrical projection 2a which is formed of a steel sheet integrally with the housing member 2c and corresponds to the cylindrical support 4A of the preceding example shown in FIG. 15. A bearing receiver 16 is also formed of a steel sheet by press-working into a form of bottomed cylinder, having an open end 16b which is firmly fitted in the cylindrical projection 2a of the first housing member 2C. This bearing receiver corresponds to the projection 4B of FIG. 15. In this case also, the inner diameter of the open end 16b is greater than the inner diameter of bearing receiver 16c for smooth insertion of a bearing 6.

A stator support cylinder 12 is drawn from a steel sheet. This stator support cylinder 12 has a diametrically smaller section on which a stator 7 is mounted as well as a larger section which is mounted on the outer surface of the cylindrical projection 2a of the first housing member 2C and secured by spot welding, for example.

In this manner, these three components, i.e. the stator support cylinder 12, the bearing receiver 16, and the first housing member 2C, may be securely coupled together. Mounting of the stator 7 may be accomplished without molding it to prevent vibrations.

Unlike the fifth and sixth example described above where the cylindrical support 4A and the bearing receiver 4a are integral with each other, it is possible to fabricate the stator support cylinder 16 and the first housing member 2C separately, so that they can be easily press-worked separately from individual sheet metals without double-pressing a sheet metal, thereby allowing for precise fabrication of these components. This implies that the bearing receiver 16 may have a better circular curvature and that the gap between the stator and the rotor may be better controlled for minimization of the gap to improve torque efficiency of the motor.

It would be noted that the section of the stator support cylinder 12 fitted on the cylindrical projection 2a has a smaller diameter than the section on which the stator 7 is fitted. Thus, there is a boundary or step 12a between these sections, which step serves as a stop for positioning the stator 7 at a predetermined position on the cylinder 12.

Figure 17:
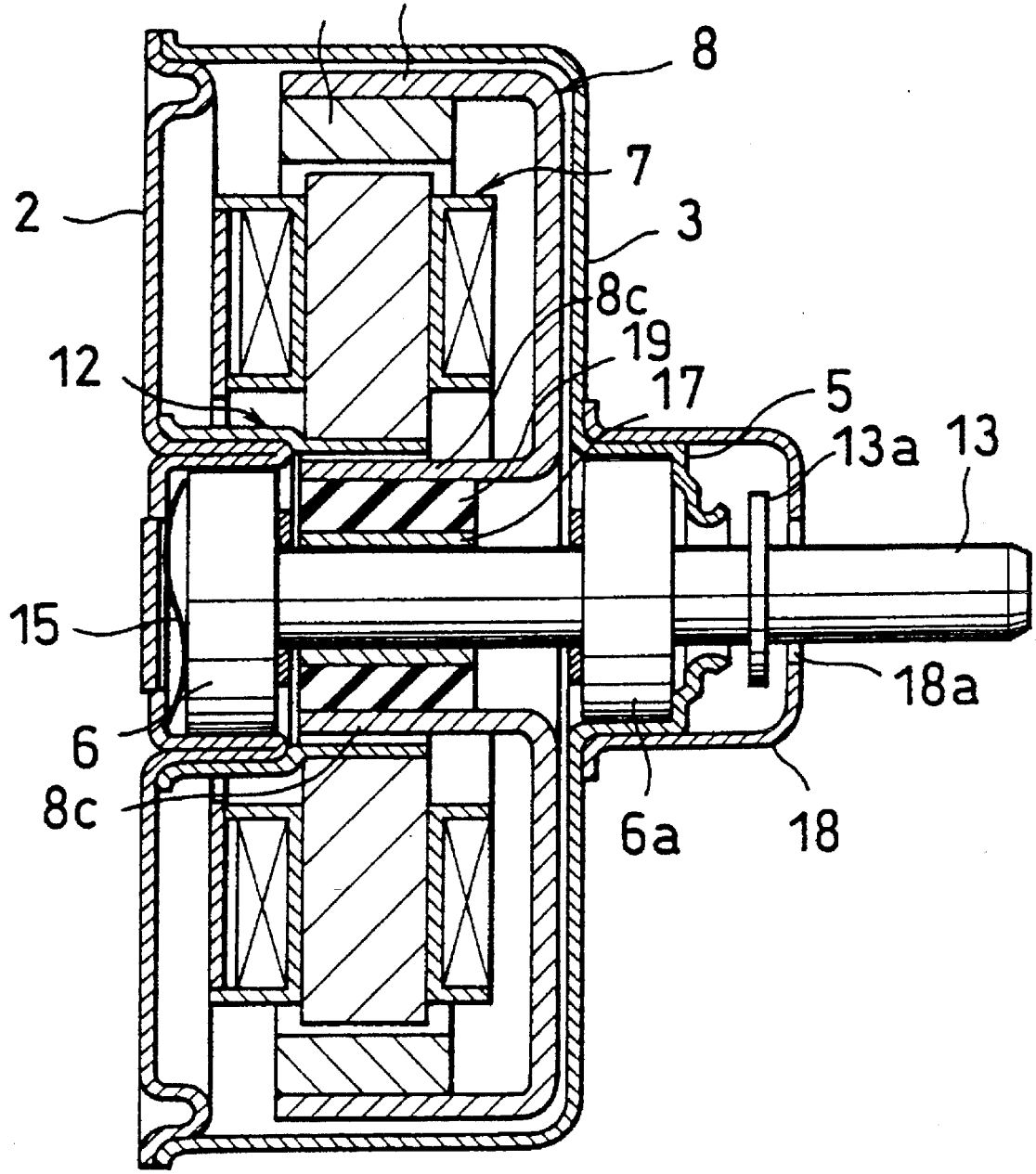
FIG. 17 is a side cross section of an eighth outer rotor type brushless DC motor according to the invention, which has a magnets support mounted on a shaft via a vibration-preventive rubber.

In the examples described above the bearing receivers in respective housings are protruding outwardly from the housing. In contrast to these examples, only one of the bearing receivers may be outwardly projected, as in the eighth example shown in FIG. 17. In FIG. 17 also, like reference numbers designate like or corresponding elements as in FIG. 1.

As shown in FIG. 17, a sheet metal is first press worked to form a bottomed cylinder, and then worked again to form an outwardly projecting bearing receiver 5, forming a second housing member 3.

A shaft 13 is inserted in the first and the second bearings 6 and 6a. A shaft mount 8c of a rotor (magnets support) 8 is securely mounted on the shaft 13 via a vibration rubber 19. The rubber 19 is forced between the shaft mount 8c and the inner sleeve 17 to thereby firmly connecting the shaft and the shaft mount 8c, and hence the rotor 8.

The shaft 13 is provided with a knurling (not shown) facilitating fixation of the inner sleeve 17 on the shaft 13, and preventing the magnets support 8 from slipping off the shaft 13.

In order to prevent any water from infiltrating into the housing along the shaft 13, a water stop 13a is fitted on the shaft 13 and a cap 18 is provided on the bearing receiver 5 of the second housing member 3. The cap 18 has a hole 18a for draining the water trapped in the cap 18.

Since the first housing member 2 and the second housing member 3 of this example are each press-worked from steel sheets, they can be of compact design. By forcing the stator 7 on the support cylinder 12 and by securely fitting the stator support cylinder 12 on the central double-wall projecting cylinder, the stator may be secured in position without molding. The rotor 8 is configured to fit within the second housing member by bending a electrical steel sheet, the body 1 of the motor may be greatly reduced in thickens, in just the same way as in the first example shown in FIG. 1. In addition, this example has a further advantage that the vibration preventive rubber 19 inserted between the rotor 8 and the shaft 13 may prevent the vibrations of the rotor 8 from propagating to the shaft 13.

Figure 18:
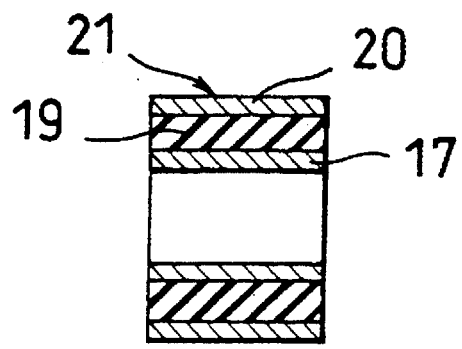
FIG. 18 is a side cross section of a sleeve mounted in the eighth outer rotor type brushless DC motor according to the invention.

Although the vibration preventive rubber 19 is described in the above example to be inserted between the shaft mount 8c and the inner sleeve 17, it is not limited to this arrangement. For example, as shown in FIG. 18, the rubber 19 may be inserted between the inner sleeve 17 and an outer sleeve 20 which is secured inside the shaft mount 8c, so that they form altogether forming a sleeve assembly 21.

Figure 19:
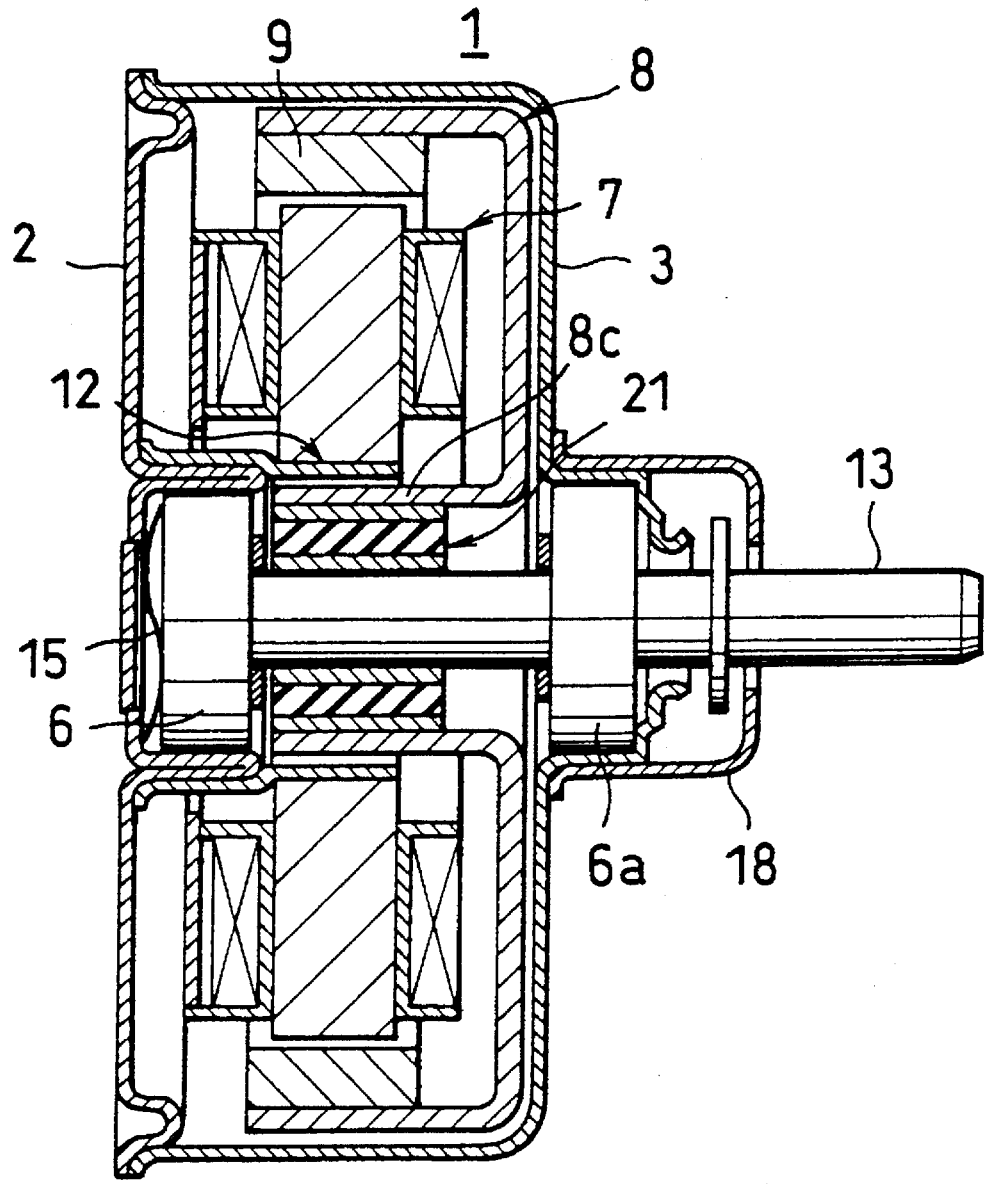
FIG. 19 is a side cross section of a ninth outer rotor type brushless DC motor according to the invention, equipped with the sleeve of FIG. 18.

After securely inserting the sleeve assembly 21 inside the shaft mount 8c, the shaft 13 may be forced into the inner sleeve 17 and then mounted in the bearings, as shown in FIG. 19. This produce is simpler than the foregoing steps in mounting the rotor 8 on the shaft 13 via the rubber 19.

Figure 20:
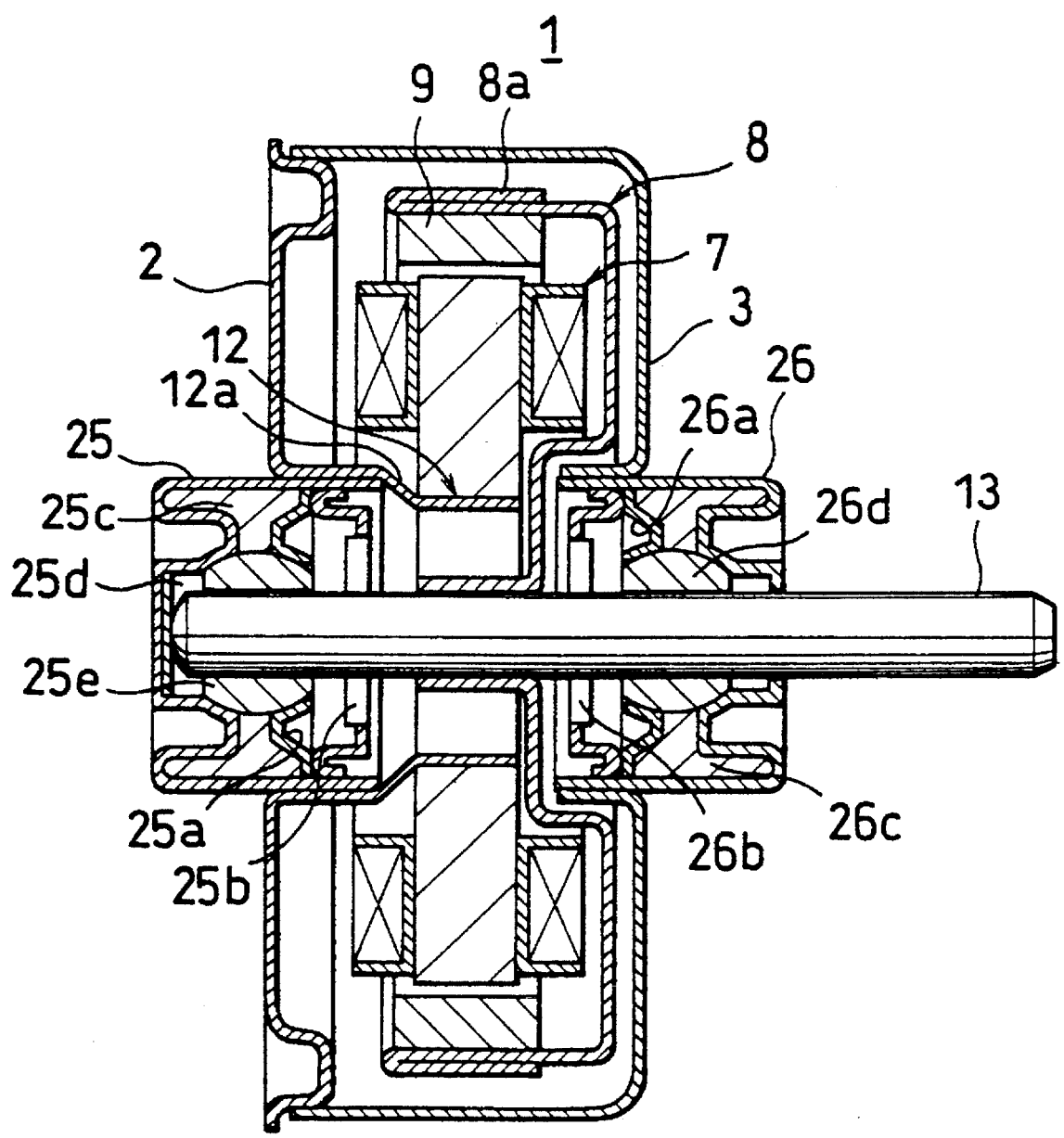
FIG. 20 is a side cross section of a tenth outer rotor type brushless DC motor according to the invention, equipped with bearings of sintered metal.

Referring now to FIG. 20, there is shown a tenth example, in which like reference numbers designate like or corresponding elements as in FIG. 1.

This outer rotor type brushless DC motor has an bearing 25e (made of sintered metal) on one end of a shaft 13, a self-adjustable spring 25a round the bearing 25e, an oil cap 26b, an oil soaking wick 25c, and a thrust bearing 25d at one end of the shaft. Also provided on the shaft 13 are another bearing 26d (made of sintered metal), a self-adjustable spring 26a, an oil-cap 26b, an oil soaking wick 28c, and a bearing housing member 26 surrounding these elements. The bearing housings 25 and 25 are forced in the respective housings 2 and 3.

The use of sintered metal in stead of ordinary ball bearings provide better durability of the shaft. The oil soaking wick may further extend the life times of the bearings and the shaft, and hence enhance reliability of the motor.

Figure 21:
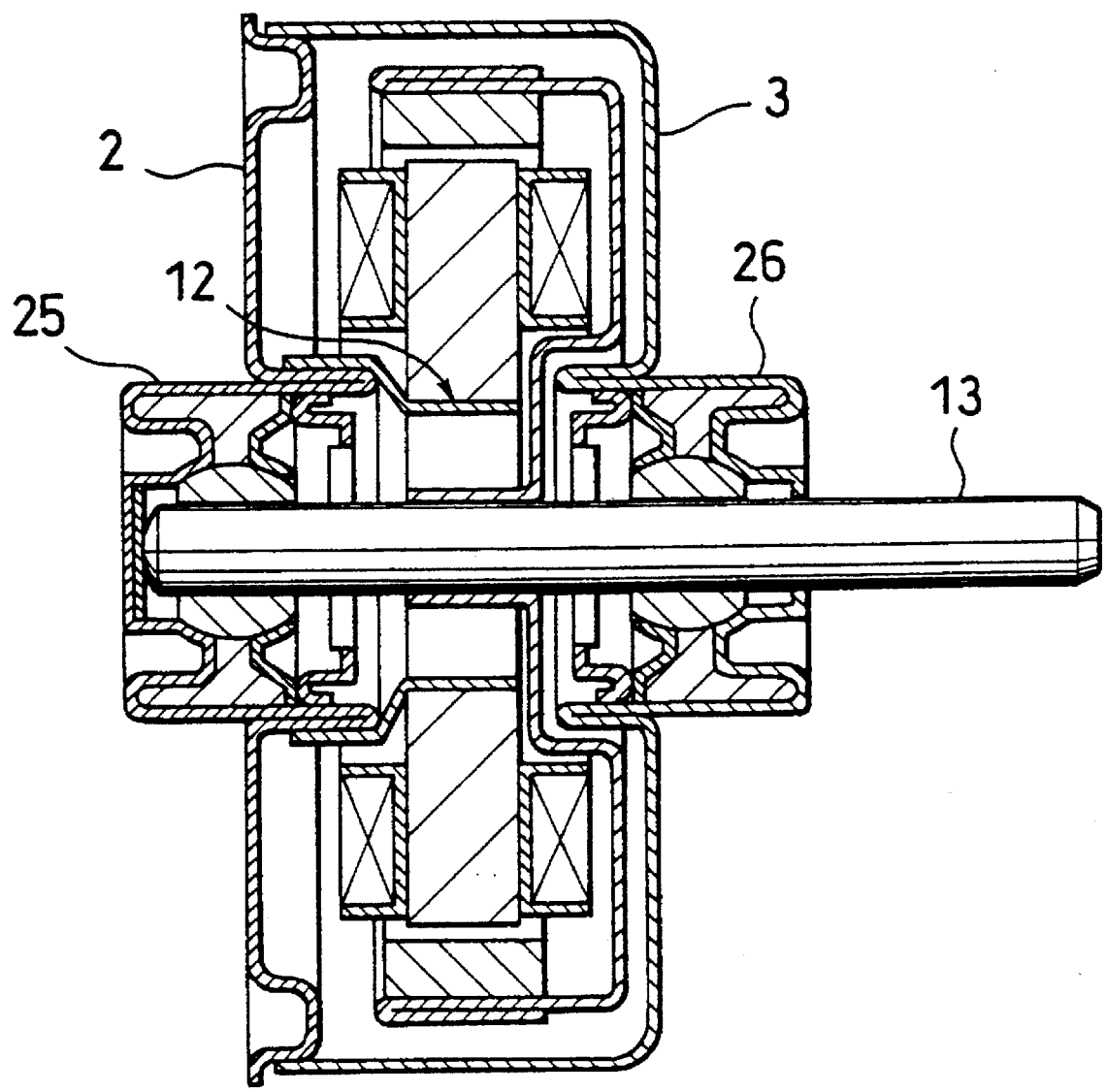
FIG. 21 is a side cross section of a eleventh outer rotor type brushless DC motor according to the invention, also equipped with bearings of sintered metal.

Referring to FIG. 21, there is shown an eleventh example of outer rotor type brushless DC motor according to the invention. Major differences between this example and the one shown in FIG. 20 are that a first housing member 2 and a bearing housing member 25 are integrally formed from a steel sheet by press-worked, a second housing member 3 and a bearing housing member 26 are integrally press-worked from a steel sheet in the same manner, and a stator support cylinder 12 is press-worked separately from another steel sheet and later fitted on the outer surface of a central, inward cylindrical projection of the housing member 2.

The merits of this example are essentially the same obtained in the preceding example.

What we claim is:

1. An outer rotor type brushless DC motor including a stator having coils each wound on a multiple teeth of said stator, and a rotor having magnets arranged to surround said stator, said DC motor comprising:

a first housing member formed of a sheet metal by press-working and having a first central bearing receiver formed by press-working in the form of generally bottomed hollow cylinder;

a second housing member formed from a sheet metal by press-working and having a second central bearing receiver also pressed in the form of generally bottomed hollow cylinder which is coaxial with said first bearing receiver, said second housing member mating, and securely connected with, said first housing member at their rims to form a space inside thereof;

a hollow cylindrical stator support formed of a sheet metal by press-working and having one end mounted on said bearing receiver of said first housing member and another end for receiving said stator on the outer surface of said stator support;

a magnets support which is press-worked from a electrical steel sheet metal for supporting magnets around said stator and inside said second housing member;

a first bearing mounted in said first bearing receiver;

a second bearing mounted in said second bearing receiver coaxially with said first bearing; and a freely rotatable shaft mounted on said first and second bearings, for securely supporting on said shaft said magnets support.

2. An outer rotor type DC motor according to claim 1, wherein said sheet metal is a steel plate;

said bearing receivers are each formed by a double press-working; and said stator support is a hollow cylinder adapted to firmly fit on the outer surface of said first bearing receiver of said first housing member.

3. A DC motor according to claim 2, wherein said stator support has a diametrically larger section and a smaller section, forming a step between said sections, said step allowing for positioning of said stator at a predetermined axial position as said stator is fitted on said stator support.

4. A DC motor according to claim 2, wherein said magnets support comprises: an annular yoke having an inner wall for securely supporting said magnets; a shaft mount in the form of hollow cylinder to be mounted on said shaft; and a radial wall extending from said annular yoke to said shaft mount.

5. A DC motor according to claim 2, wherein said magnetic support is made of a thin plate of electrical steel sheet, such that said yoke has a predetermined thickness by folding said plate at least twice to provide said yoke with a predetermined total thickness.

6. A DC motor according to claim 1, wherein said sheet metal is a steel plate; and said first and said second housing members have respective outwardly projecting bearing receivers formed by press-working; and said one end of said stator support has a form of flange to be fitted within a positioning recess formed on the outer surface of said first bearing receiver.

7. A DC motor according to claim 6, wherein said bearing receiver has a recess, formed on the outer surface of said bearing receiver, for receiving and positioning said stator support at a predetermined position.

8. A DC motor according to claim 1, wherein said shaft mount is mounted on said shaft via a vibration prevention rubber.

9. A DC motor according to claim 8, further comprising an outer metal sleeve fixedly mounted on the inside of said shaft mount; and an inner metal sleeve which is securely mounted on said shaft, wherein said vibration prevention rubber is forced in between said outer and inner metal sleeves.

10. A DC motor according to claim 1, wherein said bearings of said first and said second housing members are wicks made of sintered metal.

11. An outer rotor type brushless DC motor including a stator having coils each wound on respective teeth of said stator, and a rotor having magnets arranged to surround said stator, said DC motor comprising:

a first housing member formed of a sheet metal by press-working and having a central, cylindrical projection formed by press-working;

a hollow cylindrical stator support formed of a sheet metal by press-working and having one end closed to form a first bearing receiver and adapted to receiving said stator on the outer surface of said stator support, said stator support mounted inside said first housing member;

a second housing member formed of a sheet metal by press-working and having a second central, inwardly projecting cylindrical bearing receiver formed by press-working such that said second cylindrical bearing receiver is coaxial with said first bearing receiver, said second housing member mating and securely connected with said first housing member at their peripheries to form a space inside thereof;

a first bearing mounted in said first bearing receiver;

a second bearing mounted in said second bearing receiver coaxially with said first bearing;

a magnets support formed of a electrical steel sheet plate by press-working for supporting said magnets around said stator and inside said second housing member;

a freely rotatable shaft mounted on said first and second bearings for securely supporting said stator mounted on said shaft.

12. A DC motor according to claim 11, wherein said cylindrical stator support has a diametrically smaller section which is fitted inside said cylindrical projection of said first housing member, and a diametrically smaller section for receiving on the outer surface thereof said stator, and a step across said diametrically larger and smaller sections serving as a stop for positioning said cylindrical stator support at a predetermined position on said projecting cylinder.

13. An outer rotor type brushless DC motor including a stator having coils each wound on respective teeth of said stator, and a rotor having magnets arranged to surround said stator, said DC motor comprising:

a first housing member formed of a sheet metal by press-working and having a central cylindrical projection formed by press-working, and a first outwardly projecting bearing receiver formed inside and coaxial with said central cylinder by press-working;

a second housing member formed of a sheet metal by press-working and having a second outwardly projecting bearing receiver coaxial with said first bearing receiver by press-working, said second housing member mating, and securely connected with, said first housing member at their peripheries to form a space inside thereof;

a first bearing mounted in said first bearing receiver;

a second bearing mounted in said second bearing receiver coaxially with said first bearing;

a freely rotatable shaft mounted on said first and second bearings;

a hollow cylindrical stator support formed from a sheet metal by press-working and having one end mounted on said bearing receiver of said first housing member and another end for receiving said stator on the outer surface of said stator support; a magnets support press-worked from a electrical steel sheet metal for supporting magnets around said stator and inside said second housing member, said magnets support securely mounted on said shaft.

14. A DC motor according to claim 13, wherein said cylindrical support has an inner diameter greater than that of said first bearing receiver.

* * * * *